United States Patent
Halling

(10) Patent No.: US 7,823,264 B1
(45) Date of Patent: Nov. 2, 2010

(54) SEALS AND SEALING METHODS

(75) Inventor: Horace P. Halling, 60 Green La., Durham, CT (US) 06422

(73) Assignee: Horace P. Halling, Durham, CT (US)

( * ) Notice: Subject to any disclaimer, the term of this patent is extended or adjusted under 35 U.S.C. 154(b) by 465 days.

(21) Appl. No.: 11/948,191

(22) Filed: Nov. 30, 2007

Related U.S. Application Data

(60) Provisional application No. 60/870,142, filed on Dec. 15, 2006.

(51) Int. Cl.
 *B23P 11/02* (2006.01)
(52) U.S. Cl. ...................................................... 29/451
(58) Field of Classification Search ............ 29/451, 29/464, 468, 235, 237, 238, 255; 277/322, 277/327, 590, 595, 596, 608, 606; 285/80, 285/95
See application file for complete search history.

(56) References Cited

U.S. PATENT DOCUMENTS

| | | | |
|---|---|---|---|
| 1,671,697 A | 5/1928 | Burke | |
| 1,719,720 A | 7/1929 | Olsen | |
| 2,943,667 A | 7/1960 | Ewing et al. | |
| 3,226,138 A * | 12/1965 | Ellis | 285/332.3 |
| 4,064,730 A | 12/1977 | Gerretz | |
| 4,770,426 A * | 9/1988 | Kropatsch | 277/322 |
| 5,176,413 A | 1/1993 | Westman | |
| 5,797,603 A | 8/1998 | Voirol et al. | |
| 6,550,822 B2 | 4/2003 | Mannella et al. | |

* cited by examiner

*Primary Examiner*—John C Hong
(74) *Attorney, Agent, or Firm*—Robert Curcio; DeLio & Peterson, LLC

(57) ABSTRACT

To seal an inboard member to an outboard member, a metallic annular seal is inserted into the outboard member to align with an inwardly-open channel in the outboard member. The seal is outwardly expanded at least partially into the channel by a combination of elastic and plastic deformation. The seal is released to allow inward elastic partial recovery. The inboard member is inserted into the seal with interference so as to further outwardly expand the seal and provide sealing engagement between the inboard and outboard members.

12 Claims, 8 Drawing Sheets

SEALS AND SEALING METHODS

CROSS REFERENCE TO RELATED APPLICATION

Benefit is claimed of U.S. patent application 60/870,142, entitled SEAL and filed Dec. 15, 2006, the disclosure of which is incorporated in its entirety herein as if set forth at length.

BACKGROUND OF THE INVENTION

The invention relates to seals. More particularly, the invention relates to sealing between concentric members.

Sealing between inboard and outboard concentric members has presented practical problems, especially when involving aggressive or high temperature fluids. The problems generally relate to the capturing of the seal by one of the members. For example, the seal may be captured in a radially open channel/groove in one of the members and may engage a cylindrical surface of the other member. If the channel is an outwardly open channel in the inner/inboard member, placing the seal in the channel presents difficulties. An elastomeric seal may simply be stretched and released into the channel. A metallic seal may need to be split to permit its expansion. Accordingly, side-by-side dual split metallic seals are often used in combinations where the splits are offset from each other and the associated gaps are sealed radially by means of another split ring between the pair and the channel base.

Whereas elastomeric seals may suffer lower robustness than metallic seals, the metallic seals may suffer greater complexity and manufacturing cost. An alternative may involve assembling at least one of the members of multiple pieces so that the channel is closed only after a continuous metallic seal ring is installed. This, however, also presents manufacturing and space-efficiency detriments.

An inwardly open channel in the outer/outboard member may be used with an elastomeric or split seal wherein the seal is contracted (e.g., by looping, flexing, or overlapping of ends) to permit installation and then manipulated (e.g., worked in by hand) to fill the channel. This presents similar detriments to those described above.

SUMMARY OF THE INVENTION

Accordingly, one aspect of the invention involves a method for sealing an inboard member to an outboard member. A metallic annular seal is inserted into the outboard member to align with an inwardly-open channel in the outboard member. The seal is outwardly expanded at least partially into the channel by a combination of elastic and plastic deformation. The seal is released to allow inward elastic partial recovery or springback. The inboard member is inserted into the seal with interference so as to further outwardly expand the seal (e.g., to achieve sealing engagement with both members).

In various implementations, during the insertion of the inboard member, a first longitudinal end of the channel may restrain the seal. The insertion of the inboard member may bring the seal into bi-directional sealing engagement with the channel. The insertion of the inboard member may bring the seal into engagement with an outboard base surface of the channel.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
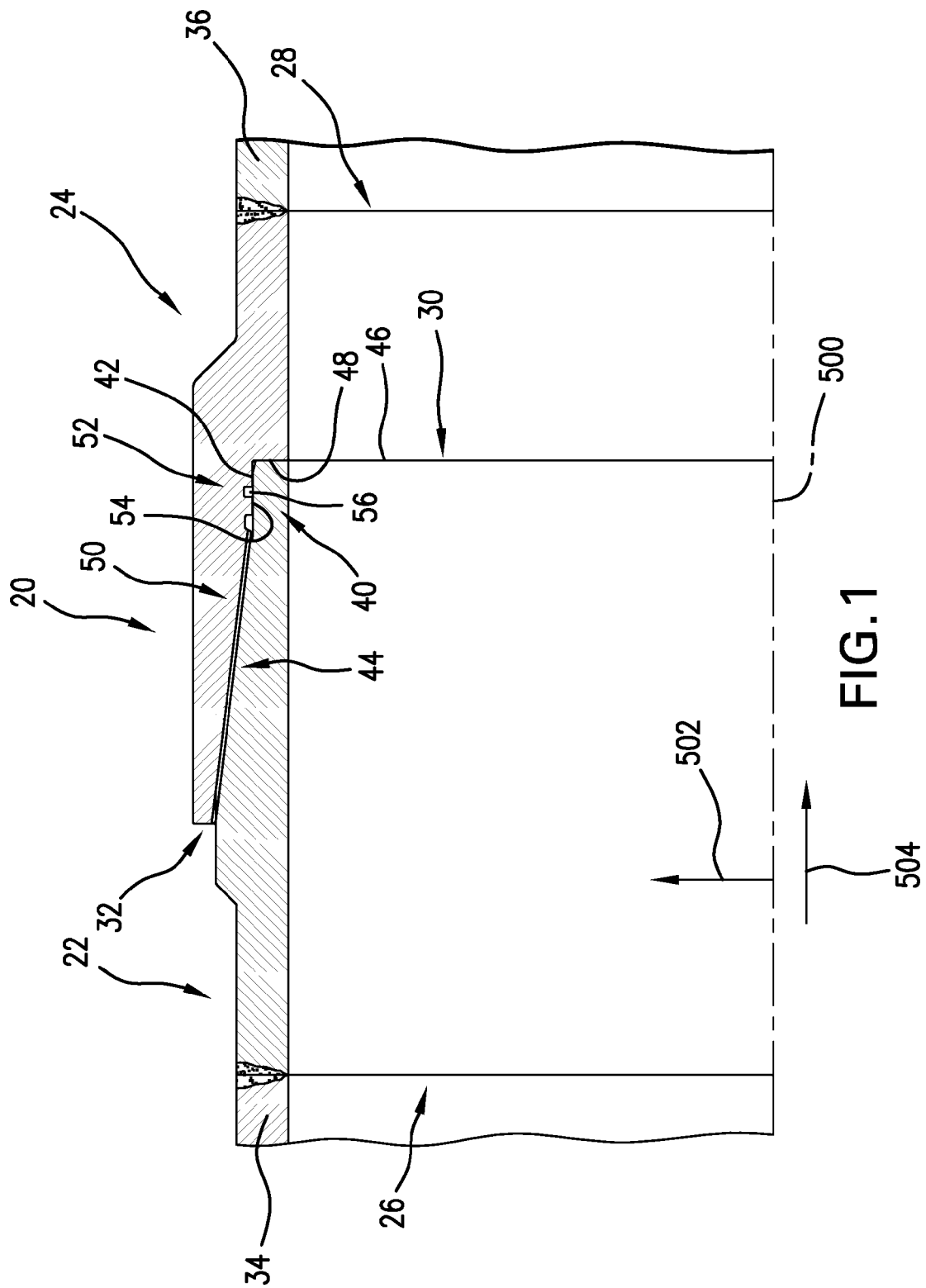
FIG. 1 is a partial central longitudinal sectional view of a pipe coupling.

FIG. 1 shows a pipe coupling (coupler) 20 including first and second members (or coupling moieties) 22 and 24 and a central longitudinal axis 500. The exemplary members have (longitudinally) outboard ends 26 and 28 and inboard ends 30 and 32. Portions adjacent the outboard ends may be adapted (e.g., sized, shaped, or otherwise configured) for mating to associated pipes 34 and 36 (e.g., by welding as is known in the art). The members 22 and 24 may be pre-mated to the respective pipes 34 and 36 (i.e., before mating the members to each other), although other variations are possible. A portion 40 of the first member near the inboard end 30 has an exterior sealing surface 42. A portion 44 between the sealing surface and the outboard end is externally threaded. In the coupled/assembled/mated condition of the exemplary coupling, an annular rim surface 46 of the first member 22 at its inboard end 30 abuts an internal shoulder surface 48 of the second member 24. FIG. 1 also shows a radial direction 502 and a direction of insertion 504 of the first member 22 into the second member 24.

Figure 2:
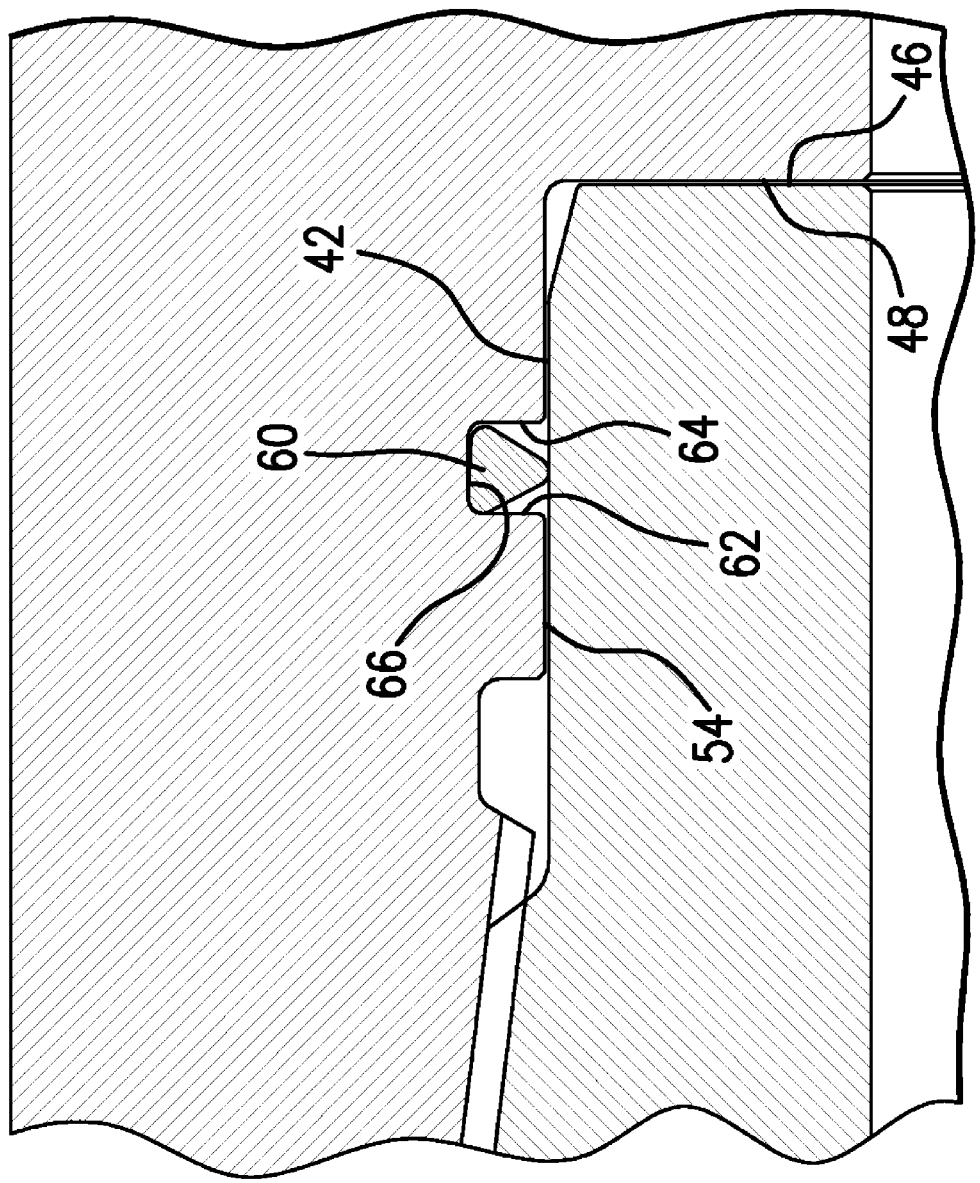
FIG. 2 is an enlarged view of a seal region of the coupling of FIG. 1.

The second member 24 has an internally threaded portion 50 positioned to mate with the externally threaded portion 44 of the first member. Between the internally threaded portion 50 and the outboard end 28, the second member has a sealing portion 52 having an interior surface 54 and an inwardly open channel 56. A seal 60 (FIG. 2) is carried in the channel to seal with the sealing surface 42 of the first member. The exemplary channel 56 is a right channel having an inboard radially-extending longitudinal end (side) wall 62, an outboard radially-extending longitudinal end wall 64 spaced therefrom, and a longitudinally-extending base wall 66 joining the end walls 62 and 64. Non-right channels may be used (e.g., a dovetail where both end walls taper to converge away from the base wall or semi-dovetail where just one (e.g., 64) does).

Figure 3:
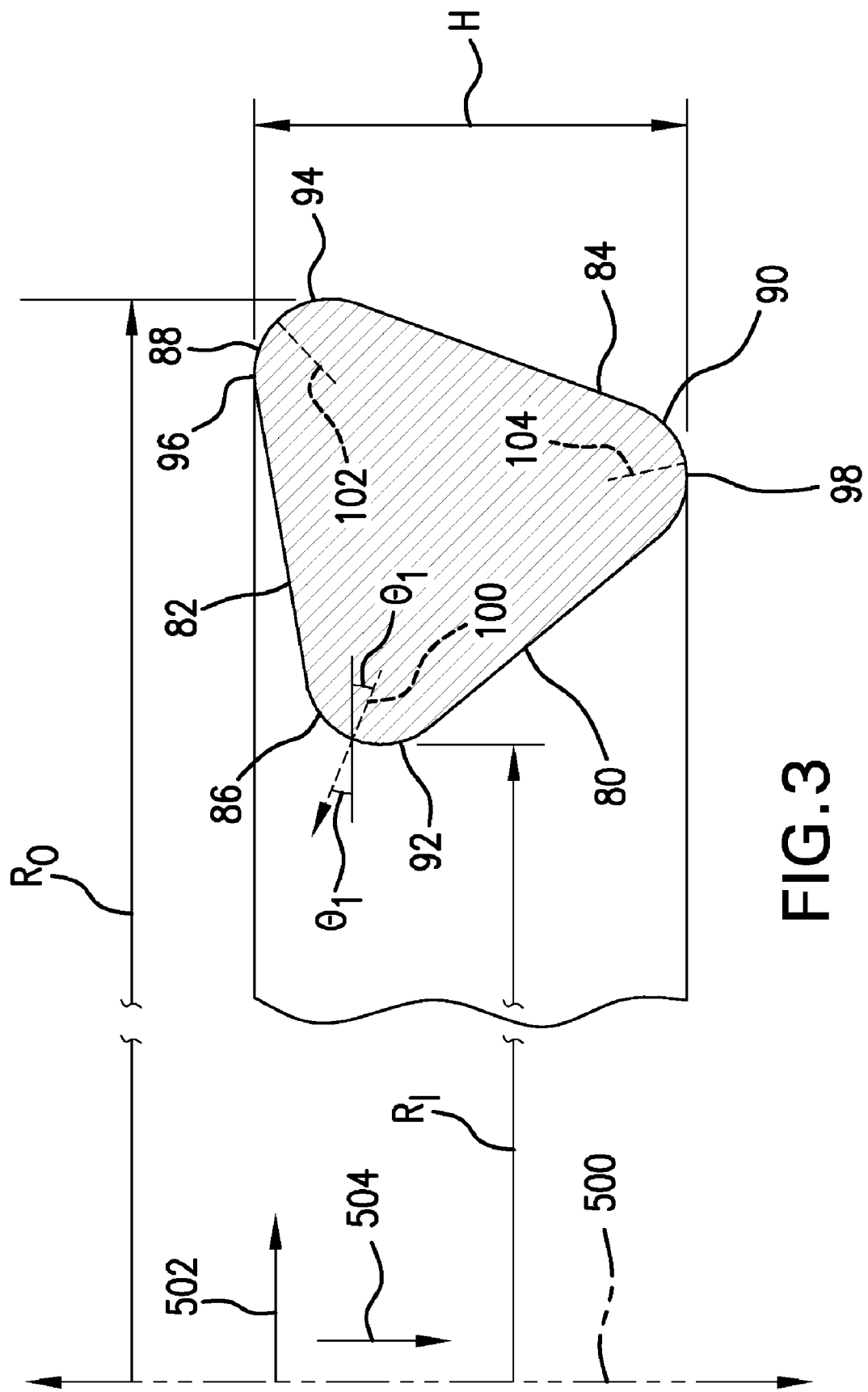
FIG. 3 is a partial central longitudinal sectional view of the seal of the coupling of FIG. 1.

The exemplary seal 60 is a continuous annular metal ring (e.g., not split or segmented) which may be radially expanded to fit in the channel. FIG. 3 shows the ring as having an exemplary central longitudinal cross-section characterized by a rounded-corner equilateral triangle. The triangle has three faces 80, 82, and 84 and three rounded corners 86, 88, and 90. The exemplary triangle is oriented so that: one of the corners forms an inboard extreme 92 of the seal in a relaxed condition; another of the corners forms a relaxed outboard radial extreme 94 and one of the longitudinal extremes or rims 96; and the final corner forms the other longitudinal extreme or rim 98. FIG. 3 further shows a seal height H (between longitudinal extremes 96 and 98), an inner radius $R_I$ at the inboard extreme 92, and an outer radius $R_O$ at the outboard extreme 94.

The corners 86, 88, and 90 have respective centerlines 100, 102, and 104. The seal may be placed in the channel 56 via an at least partially inelastic expansion. The centerline 100 of the illustrated inboard corner 86 is angled off-radial (by an angle $\theta_I$) to project from the corner partially against the direction of insertion 504 of the first member relative to the second member.

Figure 4:
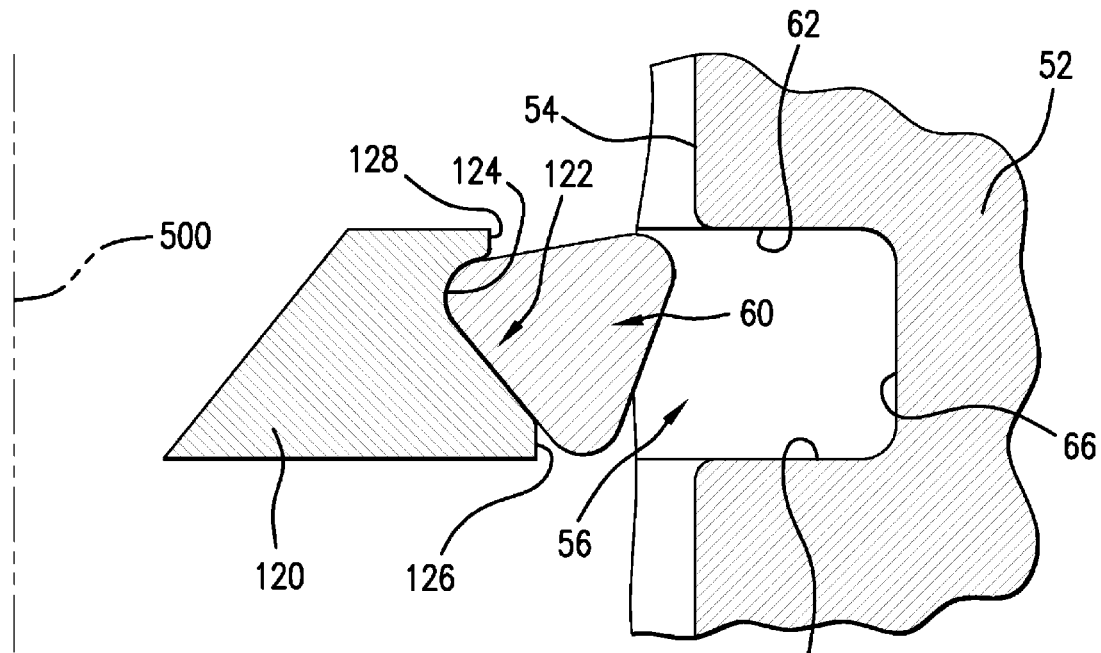
FIG. 4 is a partial central longitudinal sectional view of the seal of FIG. 1 in a first stage of installation.

In an exemplary installation sequence, the seal is mounted to a segmented expander such as is known for use in flaring or expanding tubing. An outer diameter (OD) surface of each segment or shoe 120 (FIG. 4) engages the seal along the inboard corner 86. The exemplary shoes 120 have a radially outwardly open circumferential channel 122 defined by a surface 124. A cross-section of the channel 122 may be complementary to the cross-section of the seal 60 to longitudinally retain the seal relative to the shoes during seal insertion and expansion. For example, outside of the coupling the shoes may initially be in a maximally radially retracted condition wherein the seal may be installed via passing over a radial rim 126 or 128 of the assembly of shoes. The shoe assembly may then be radially expanded to capture and retain the seal via the channel 122. The expander may then be inserted (e.g., through the end 32 of the first member 24) to bring the seal into longitudinal alignment with the channel 56 (FIG. 4).

Figure 5:
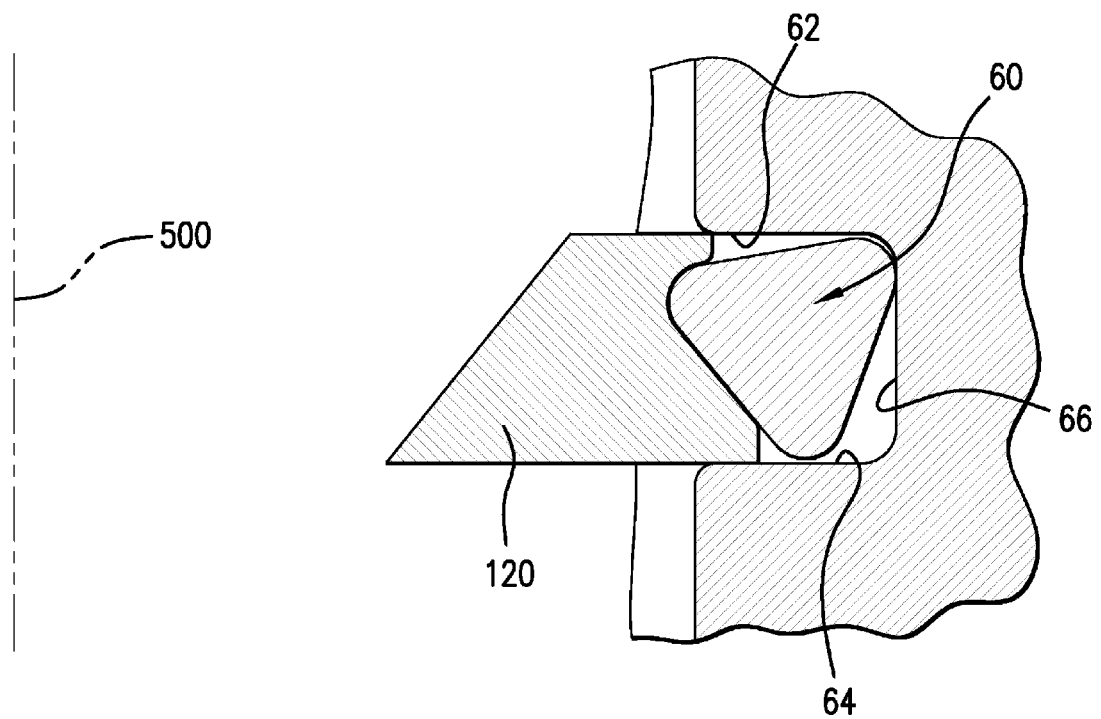
FIG. 5 is a view of the seal of FIG. 4 in a second stage of installation.
Figure 6:
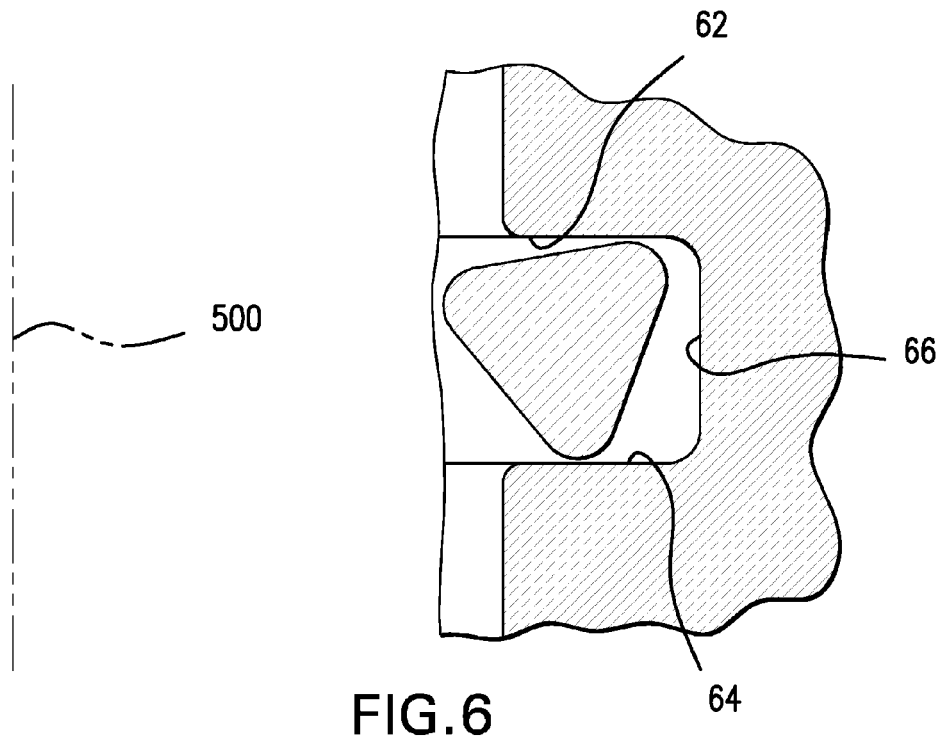
FIG. 6 is a view of the seal of FIG. 4 in a third stage of installation.

The shoes/segments are then driven radially and circumferentially apart to expand the seal to enter the channel 56 (FIG. 5). This expansion may include elastic and inelastic (plastic) components. The expander shoes may be configured so that their seal-engaging OD peripheries are coaxial with the axis 500 at the completion of seal expansion and before expander contraction. The expander may be contracted to release the outward pressure on the seal. A portion of the expansion will reverse (elastic springback). However, the non-reversed expansion is enough to leave the seal partially within the channel (FIG. 6). When sufficiently contracted, the expander may then be withdrawn/extracted from the second member 24.

Figure 7:
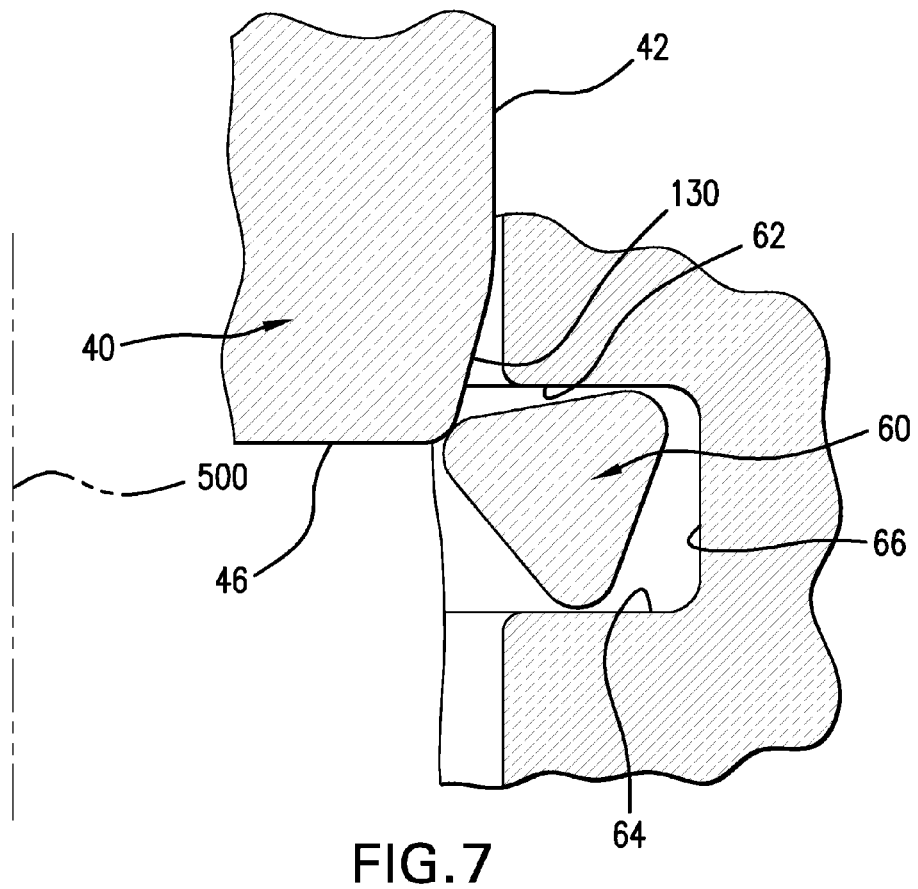
FIG. 7 is a view of the seal of FIG. 4 in a fourth stage of installation.
Figure 8:
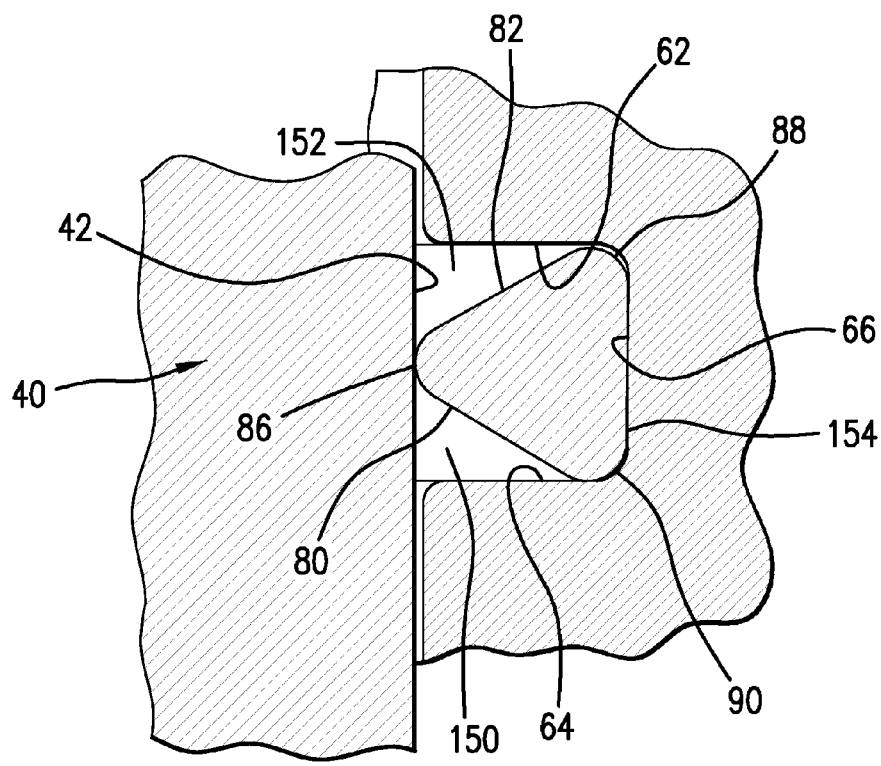
FIG. 8 is a view of the seal of FIG. 4 fully installed.

Upon insertion of the first member 22 (e.g., in a final stage of the threading of the first member into the second member 24), a portion of the first member may engage the seal (FIG. 7). In the illustrated example, a portion having a tapered surface 130 between the first end 30 and the sealing surface 42 initially engages the seal. Further insertion (e.g., via further threading) drives the members 22 and 24 further together. The seal 60 is retained by the second end wall 64 of the channel engaging the corner 90. The insertion causes interference between the seal 60 and the first member 22 (e.g., surface 130) and second member 24 (e.g., end wall 64) and drives the seal radially outward along the tapered surface 130 to expand the seal into engagement with the channel base surface 66. In/after a final stage of insertion, the interference is such that the seal inboard corner 86 is sealingly engaged to the sealing surface 42 while the corner 88 is sealingly engaged to the channel base surface 66 to seal the members (FIG. 8).

Figure 9:
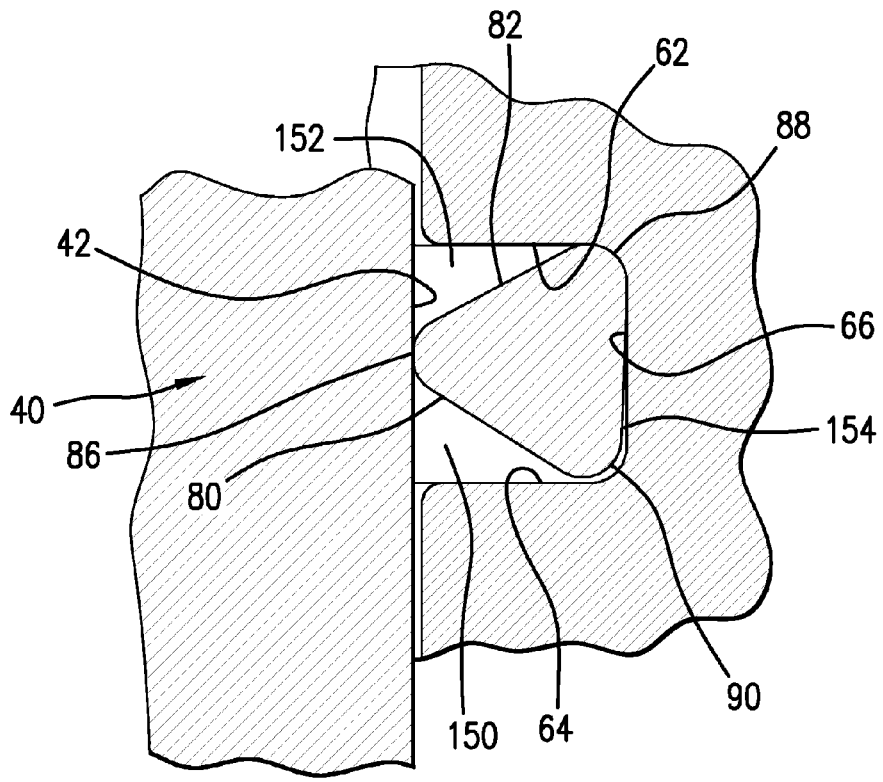
FIG. 9 is a view of the seal of FIG. 7 under internal pressure loading.

Internal pressurization of the joint (e.g., from the working fluid) may expose a portion of the channel space on one side of the seal to a pressure above that on the other side of the seal. The shape and dimensions of the seal cross-section may be configured so that this pressure biases the seal into firmer engagement with the channel 56 and/or sealing surface 42. In the exemplary seal (FIG. 9), the inboard corner 86 and adjacent sides 80 and 82 separate a portion of the space 150 from a portion 152. The exemplary portion 150 may be proximate the interior of the coupling whereas the portion 152 may be proximate the exterior. Internal pressurization thus acts to provide a pressure differential in the portion 150 over the portion 152. In the exemplary seal, this pressure difference may act to bias the corner 88 into engagement with the longitudinal end wall 62 (e.g., into engagement with a rounded intersection of the end wall 62 with the base 66). This intersection and the corner 88 may thus serve as a fulcrum about which the pressure differential seeks to rotate the seal cross-section clockwise as viewed in FIG. 9. This pressure difference may, therefore, bias the inboard corner 86 into firmer engagement with the sealing surface 42 so as to maintain sealing integrity. During this process, the remaining seal end 90 may be out of engagement with the channel end (e.g., having a slight gap).

Figure 10:
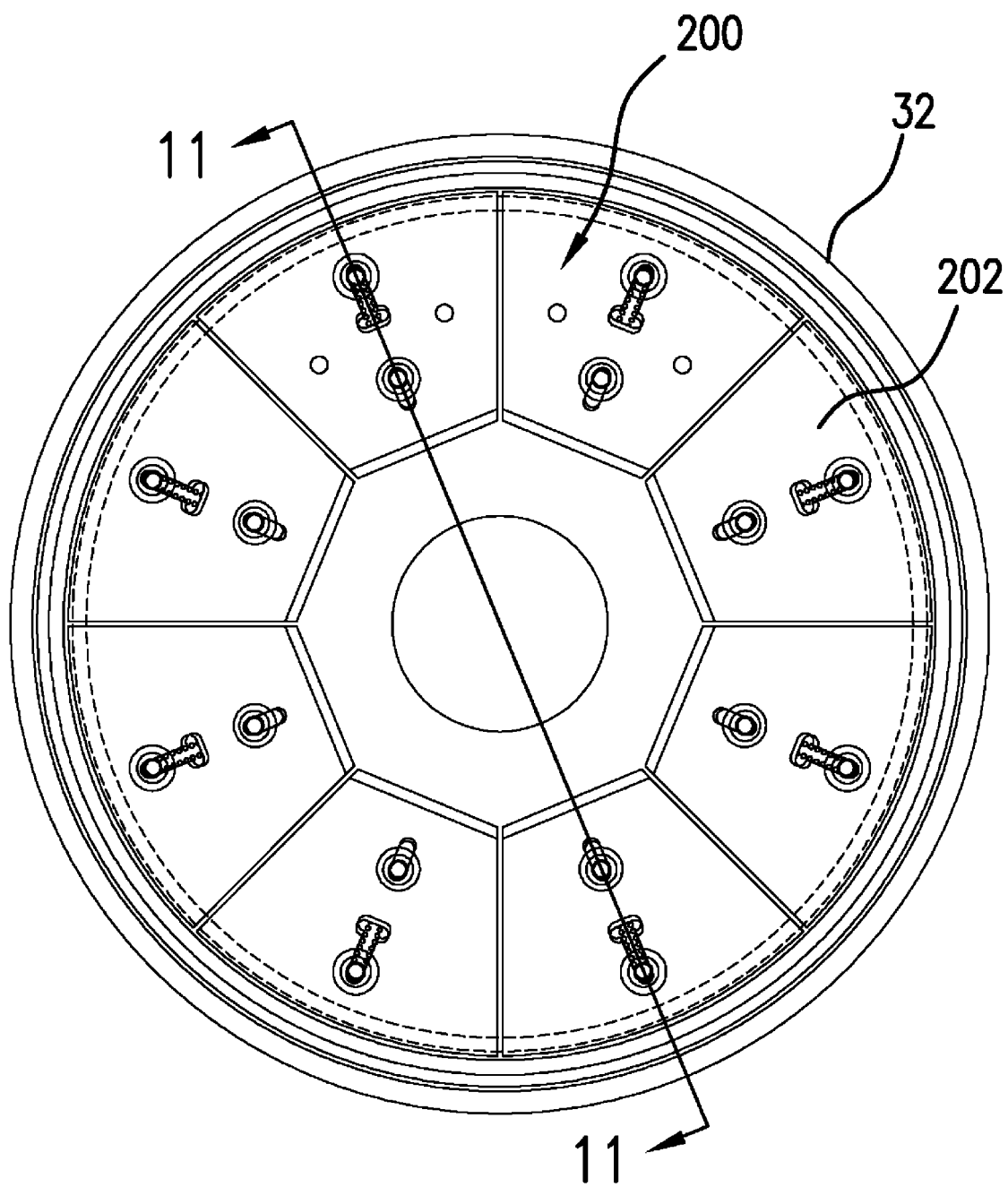
FIG. 10 is an end view of an expander.
Figure 11:
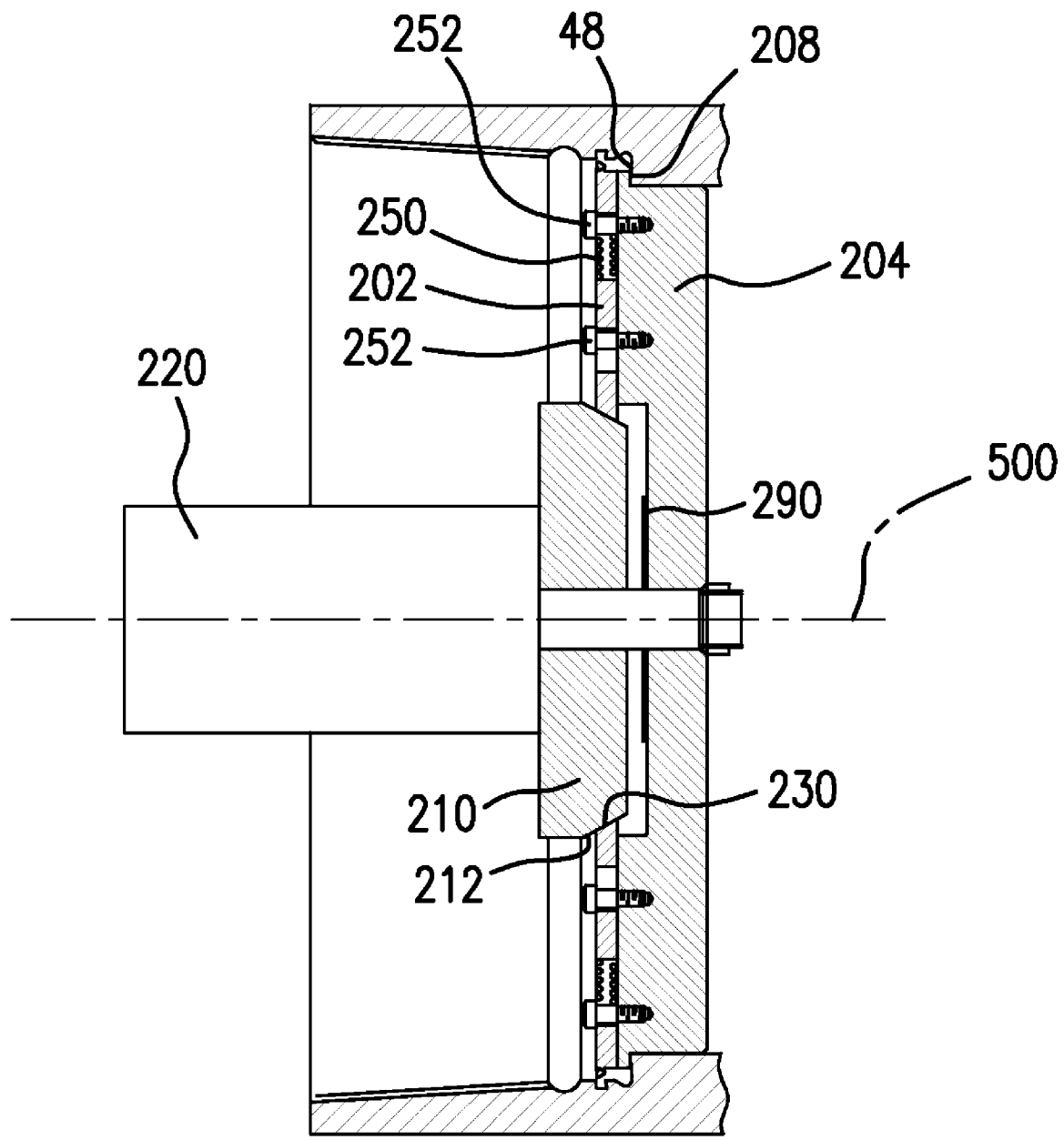
FIG. 11 is a sectional view of the expander of FIG. 10, taken along line 11-11.

FIG. 10 is a view of an exemplary expander 200 having a circumferential array of expander shoes 202. The shoes 202 are mounted for radial movement to a baseplate 204 (FIG. 11). The baseplate and second member may have mating features for longitudinally registering the seal with the channel. An exemplary mating feature includes a radial shoulder 208 of the baseplate engaging a mating shoulder (e.g., 48) of the second member 24. An expander 210 (e.g., a pyramid expander having camming facets 212) may be mounted to the baseplate for relative longitudinal reciprocal motion (e.g., driven by a push-pull cylinder or other actuator 220). When the pyramid expander is driven toward the baseplate, the camming surfaces 212 drive associated surfaces 230 of the segments radially outward. The exemplary expander 210 may bottom against a shim pack 240 carried by the baseplate. The thickness of the shim pack may be selected to provide a desired expansion at the point of bottoming. The expander may be retracted to permit release of the segments. The segments may radially retract under bias of return springs 250 guided by shoulder bolts 252. Exemplary shoe and expander material is beryllium copper. Exemplary baseplate material is aluminum alloy.

The use of metallic seal may provide improved robustness over elastomeric seals (e.g., a greater pressure capacity and temperature capability). The use of a continuous seal rather than a split ring may present one or both of improved sealing and reduced manufacturing cost. The formation of the channel 56 in a single piece (e.g., rather than one piece forming surface 62 and another forming surface 64) may provide one or more of space efficiency, reduced manufacturing cost, and robustness. Exemplary use is in the oil industry (e.g., pipes conveying crude or refined oil). In exemplary oil applications, the coupling members 22 and 24 may be made of a corrosion-resistant steel or other alloy. Other exemplary alloys used in the manufacture of seals may also be used for the present seals and include nickel-aluminum bronze, beryllium copper, nickel-based superalloys (e.g., Alloy 718, optionally silver plated), and stainless steel. Exemplary couplings have minimum inner diameters (ID) of at least 200 mm (e.g., 200-600 mm). Various alternative rectangular, trapezoidal, and other shapes of seal cross-section and their associated manufacturing techniques are disclosed in U.S. patent application Ser. No. 11/610,220, filed Dec. 13, 2006, the disclosure of which is incorporated by reference herein as if set forth at length.

One or more embodiments of the present invention have been described. Nevertheless, it will be understood that various modifications may be made without departing from the spirit and scope of the invention. For example, the particular anticipated pressure differences may influence the selection of seal cross-sectional shape and orientation (e.g., for desired pressure assist in one or both sealing directions). Use may be in joints other than those shown (e.g., bolted flange joints or clamped joints instead of threaded joints). Use may be in situations more complex than simple end-to-end pipe coupling (e.g., within wellheads, distribution manifolds or other situations). In reengineering, remanufacturing, or retrofit applications, details of the existing components to be sealed may influence details of any particular implementation. Accordingly, other embodiments are within the scope of the following claims.

What is claimed is:

1. A method for sealing an inboard member to an outboard member comprising:
   inserting a metallic annular seal into the outboard member to align with an inwardly-open channel in the outboard member;
   outwardly expanding the seal at least partially into the channel by a combination of elastic and plastic deformation;
   releasing the seal to allow inward elastic partial recovery; and
   inserting the inboard member into the seal with interference so as to further outwardly expand the seal.

2. The method of claim 1 wherein: during the insertion of the inboard member, a first longitudinal end of the channel restrains the seal.

3. The method of claim 2 further comprising:
   exposing the seal to an operational fluid pressure to bias the seal into engagement with a second longitudinal end of the channel.

4. The method of claim 2 wherein:
   the insertion of the inboard member brings the seal into bi-directional sealing engagement with the channel.

5. The method of claim 4 wherein:
   the insertion of the inboard member brings the seal into engagement with an outboard base surface of the channel.

6. The method of claim 1 wherein:
   the insertion of the inboard member brings the seal into bi-directional sealing engagement with the channel.

7. The method of claim 1 wherein:
   the insertion of the inboard member brings the seal into engagement with an outboard base surface of the channel.

8. The method of claim 1 wherein:
   hoop strain of the elastic deformation is less than a hoop strain of the plastic deformation.

9. The method of claim 1 wherein:
   the seal has a circular annular planform;
   the seal has a cross-section having an exterior perimeter formed as a triangle with rounded corners; and
   the expanding comprises engaging an inboard one of the rounded corners with a tool.

10. The method of claim 9 wherein the seal further engages one of the sides of the perimeter.

11. The method of claim 1 further comprising:
    exposing the seal to an operational fluid pressure to bias the seal into engagement with a second longitudinal end of the channel.

12. The method of claim 1 used to remanufacture a joint wherein:
    an elastomeric seal is removed from the channel prior to the insertion.

* * * * *